(12) United States Patent
Hall

(10) Patent No.: US 8,264,692 B2
(45) Date of Patent: Sep. 11, 2012

(54) PUSH-PULL TWO WAVELENGTH FABRY PEROT SENSOR FOR FIBER OPTIC ACOUSTIC SENSOR ARRAYS

(75) Inventor: David B. Hall, La Crescenta, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 512 days.

(21) Appl. No.: 12/459,906

(22) Filed: Jul. 9, 2009

(65) Prior Publication Data
US 2010/0007893 A1    Jan. 14, 2010

Related U.S. Application Data

(60) Provisional application No. 61/134,509, filed on Jul. 10, 2008.

(51) Int. Cl.
*G01B 9/02* (2006.01)

(52) U.S. Cl. .................... 356/478; 356/480

(58) Field of Classification Search ............... 356/480, 356/477, 478, 519; 385/12, 13
See application file for complete search history.

(56) References Cited

U.S. PATENT DOCUMENTS
5,929,990 A * 7/1999 Hall ................... 356/519
* cited by examiner

*Primary Examiner* — Hwa Lee
(74) *Attorney, Agent, or Firm* — Lynn & Lynn; John H. Lynn

(57) ABSTRACT

Two optical wavelengths are used to interrogate a fiber optic Fabry-Perot sensor having a moveable diaphragm that changes the width of a gap between two reflective surfaces. By picking the right operating point for the gap, the power output for one wavelength increases as the gap width changes and the power for the other wavelength decreases. A ratio of the difference of the two powers over the sum of the two powers is formed to generate a detected signal independent of power and phase fluctuations in a fiber between signal sources and sensor and between sensor and detector. This ratio, which is called the visibility, has a response proportional to the pressure of acoustic disturbances that move the diaphragm. The push-pull sensor can be used with both TDM and CW fan-out array architectures.

4 Claims, 14 Drawing Sheets $R_1 = 0.82 \qquad \lambda_A = 1550 \text{ nm}$ $R_2 = 0.82 \qquad \lambda_B = 1480 \text{ nm}$ $\text{VIS}(R_1, R_2, \text{gap}, \lambda_A, \lambda_B, \alpha=1)$ ———

$\text{VIS}(R_1, R_2, \text{gap}, \lambda_B, \lambda_B, \alpha=0.8)$ ----

US 8,264,692 B2

PUSH-PULL TWO WAVELENGTH FABRY PEROT SENSOR FOR FIBER OPTIC ACOUSTIC SENSOR ARRAYS

CROSS REFERENCE TO RELATED APPLICATION

Applicant claims priority for this application based upon U.S. Provisional Application Ser. No. 61/134,509, filed Jul. 10, 2008.

BACKGROUND OF THE INVENTION

This invention relates generally to a Fabry Perot interferometer for use in a fiber optic sensor array to sense changes in acoustic pressure. This invention relates particularly to a two-wavelength Fabry-Perot sensor system for sensing acoustic pressure.

The use of Fabry-Perot sensors in fiber optic acoustic sensor arrays has been proposed many times. However, difficulties are encountered in implementing such sensor arrays with Fabry-Perot interferometers. Fiber optic sensor systems have power fluctuations associated with source lasers, time dependent polarization effects in the fiber, and other disturbances between the source laser and sensors and between sensors and photodiode detectors.

SUMMARY OF THE INVENTION

This invention provides a two-wavelength Fabry-Perot interferometric sensor system that overcomes problems caused by optical power fluctuations in prior interferometric acoustic sensor systems.

A fiber optic sensor system according to the present invention comprises a first coherent optical signal source that produces an optical signal of wavelength $\lambda_A$, a first optical fiber arranged to receive the optical signal of wavelength $\lambda_A$, a second coherent optical signal source that produces an optical signal of wavelength $\lambda_B$, a second optical fiber arranged to receive the optical signal of wavelength $\lambda_B$, an input wavelength division multiplexer arranged to receive the optical signals of $\lambda_A$ and $\lambda_B$ from the first and second optical fibers, respectively, a signal transmission optical fiber arranged to receive optical signals of both wavelengths $\lambda_A$ and $\lambda_B$ from the wavelength division multiplexer, an array of two-wavelength Fabry-Perot interferometric sensors coupled to the signal transmission optical fiber and arranged to receive optical signals of wavelengths $\lambda_A$ and $\lambda_B$ therefrom, the array of two-wavelength Fabry-Perot interferometric sensors being arranged to operate in a push-pull mode to produce interferometer output signals in response to an acoustic pressure wave incident upon the array of two-wavelength Fabry-Perot interferometric sensors, a detector array coupled to the signal transmission optical fiber to produce electrical signals in response to the interferometer output signals, and a signal processor for processing the electrical signals from the detector array to indicate pressure from the acoustic pressure wave.

A fiber optic sensor array according to the present invention may further comprise an optical on-off switch arranged to control transmission of optical signals through the signal transmission optical fiber.

The array of two-wavelength Fabry-Perot interferometric sensors may comprise a time division multiplexed architecture connected to the optical switch wherein a plurality of optical couplers couple a corresponding plurality of two wavelength Fabry-Perot interferometric sensors to the signal transmission fiber. and an output wavelength division multiplexer arranged to divide optical signals output from the plurality of Fabry-Perot interferometric sensors into a first output signal having wavelength $\lambda_A$ and a second output signal having wavelength $\lambda_B$.

The array of two-wavelength Fabry-Perot interferometric sensors may alternatively comprise a fan-out architecture of a plurality of two wavelength Fabry-Perot interferometric sensors coupled to the input wavelength division multiplexer to receive optical signals of wavelength $\lambda_A$ and $\lambda_B$ therefrom, and a photodetector array coupled to the fan-out architecture such that each two-wavelength Fabry-Perot interferometric sensor therein has an output coupled to a first corresponding photodetector arranged to detect signals of wavelength $\lambda_A$ and to a corresponding second photodetector arranged to detect signals of wavelength $\lambda_B$.

The fiber optic sensor array may comprise a Fabry-Perot interferometric sensor formed to include a single mode optical fiber, a ferrule mounted at an end of the single mode optical fiber so as to extend a distance $W_{gap}$ beyond the end, a diaphragm mounted on the ferrule to form an enclosed region, the diaphragm being arranged to receive an acoustic pressure wave, the diaphragm being movable with respect to the end of the single mode optical fiber to modulate the distance between the diaphragm and end of the single mode optical fiber in response to pressure variations in the acoustic pressure wave, a fluid within the enclosed region; and a multimode optical fiber having an end of a multimode core arranged such that optical signals of wavelength $\lambda_A$ and $\lambda_B$ propagating in the single mode optical fiber undergo multiple reflections and produce a diverging light beam comprising interference signals of wavelengths $\lambda_A$ and $\lambda_B$ that propagates through the diaphragm and are injected into the end of the multimode core.

DETAILED DESCRIPTION OF THE INVENTION

Figure 1:
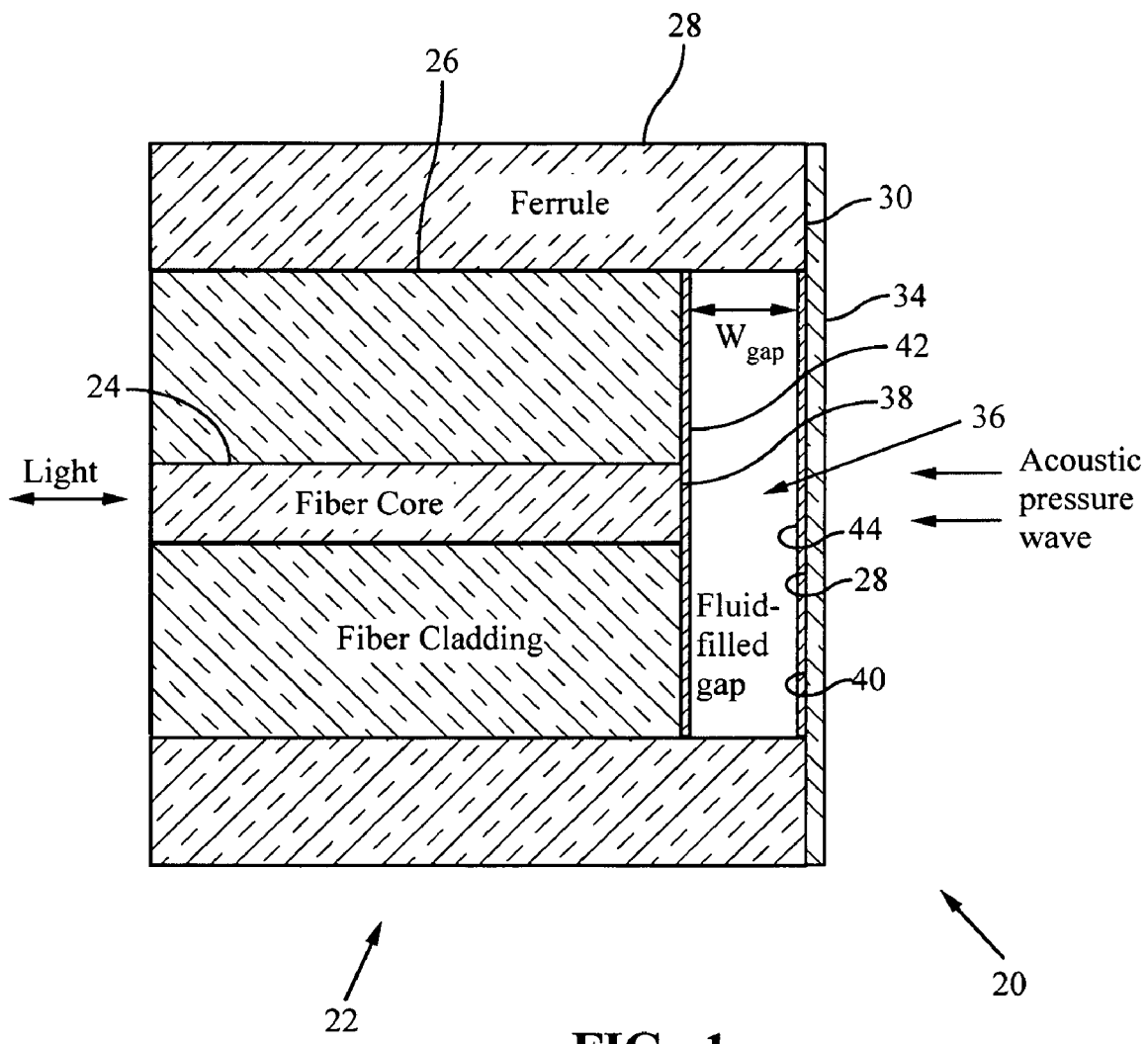
FIG. 1 illustrates a reflection mode Fabry Perot interferometer formed with an optical fiber.

FIG. 1 illustrates a Fabry Perot interferometer 20 designed for incorporation into a fiber optic sensor array. The Fabry Perot interferometer 20 comprises an optical fiber 22 having a core 24 and a cladding 26 that surrounds the core 24. Optical fiber normally has a protective jacket (not shown). In the portion of the optical fiber 22 shown in FIG. 1 the jacket has been removed and replaced with a ferrule 28 that is preferably formed of a hollow glass rod. An end 30 of the ferrule 28 extends a small distance beyond the core 24 and cladding 26 to form a small cavity 32. A diaphragm 34 is bonded to the outer end 30 of the ferrule 28 such that there is a small gap 36 between the diaphragm 34 and the optical fiber end 38. The diaphragm 34 may be formed of silica. The gap 36 preferably is filled with a fluid such as oil or other substance that has a good impedance match with water.

A light wave in the optical fiber 22 exits the optical fiber end 38 and enters the fluid filled gap 36. On the far side of the gap 36 the diaphragm 34 moves in response to incident acoustic pressure waves in a water environment. Light is reflected from both the end 38 of the optical fiber core 24 and the inner surface 40 of the diaphragm 34 back into the fiber 22. Reflectivities $R_1$ and $R_2$ for the fiber end 38 and the diaphragm surface 40, respectively, and the gap width Wgap determine how much light goes back into the optical fiber 22. The reflectivities are characteristics of the optical fiber core 24 and the diaphragm surface 40. The gap width is a function of the pressure in the acoustic wave incident upon the diaphragm 34.

The fiber end 38 and the surface 40 of the diaphragm 34 that faces the fiber tip 38 may have coatings 42 and 44, respectively formed thereon to enhance the reflectivities. The coatings may comprise either a dielectric or a metal material. The gap width Wgap between the fiber tip 38 and the diaphragm 34 is typically less than 50 microns. If the gap width is too large, the light exiting the fiber tip 38 spreads by diffraction to such an extent that after a double pass through the gap 36 a very small portion of the light can be coupled back into the fiber 22. For gap widths of 15 microns or less the diffraction spread factor is negligible for single mode fiber propagating light at 1550 nm.

Figure 2:
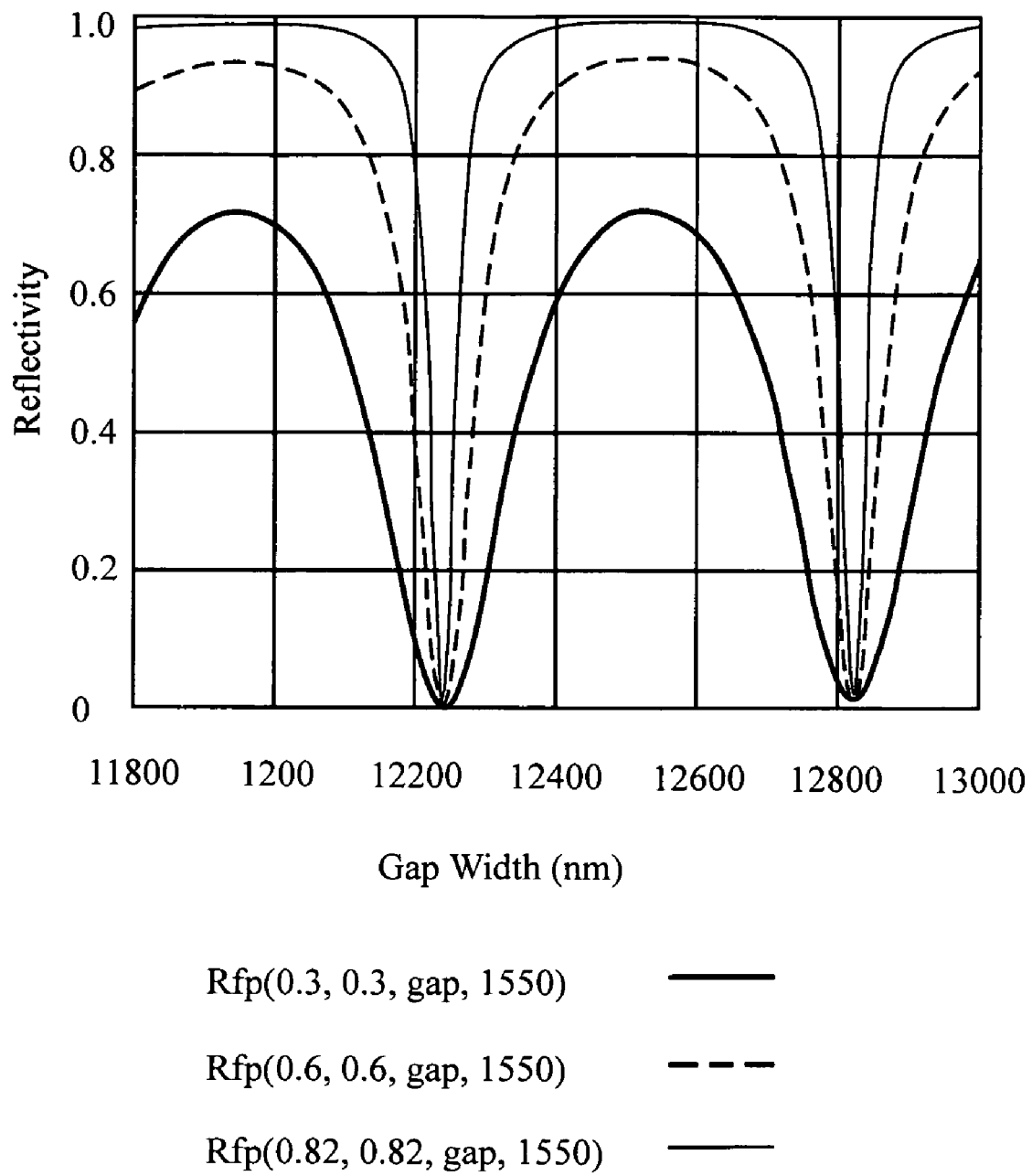
FIG. 2 graphically illustrates reflectivity as a function of gap width for the reflection mode Fabry-Perot interferometer of FIG. 1 for a wavelength of 1550 nm.

FIG. 2 graphically illustrates reflectivity as a function of gap width for the reflection mode Fabry-Perot interferometer of FIG. 1 for a wavelength of 1550 nm.

Reflected power $R_{fp}$ for the Fabry-Perot interferometer 10 back into the optical fiber 12 is given by $$R_{fp}(R_1, R_2, \text{gap}, \lambda) = \frac{R_1 + R_2 - 2\sqrt{R_1 R_2}\cos\left(\frac{4\pi n_{fluid} \text{gap}}{\lambda}\right)}{1 + R_1 R_2 - 2\sqrt{R_1 R_2}\cos\left(\frac{4\pi n_{fluid} \text{gap}}{\lambda}\right)}. \quad (1)$$

The refractive index of the fluid in the gap is given by $n_{fluid}$. A plot of reflected power back into the fiber as a function of gap width and mirror reflectivities is shown in FIG. 2. The plot shows reflected power minima at multiples of $\lambda/2=583$ nm where $\lambda$ is 1550 nm and the fluid is water having a refractive index n=1.33. Matched mirror reflectivities of 0.30, 0.60, and 0.82 show a pronounced narrowing of the resonance dip as reflectivity goes up. The resonance dip goes to zero only for the case of the matched reflectivities. The finesse associated with the highest reflectivity is 16.

On each side of the resonance dip the slope or change in reflectivity with change in gap width is a maximum at a reflectivity of about 30%. This is the operating point of the sensor. At this point, small displacements of the diaphragm yield small changes in gap width to produce a maximum change in power going back into the fiber 22.

Two Wavelength Push-Pull Method

Figure 3:
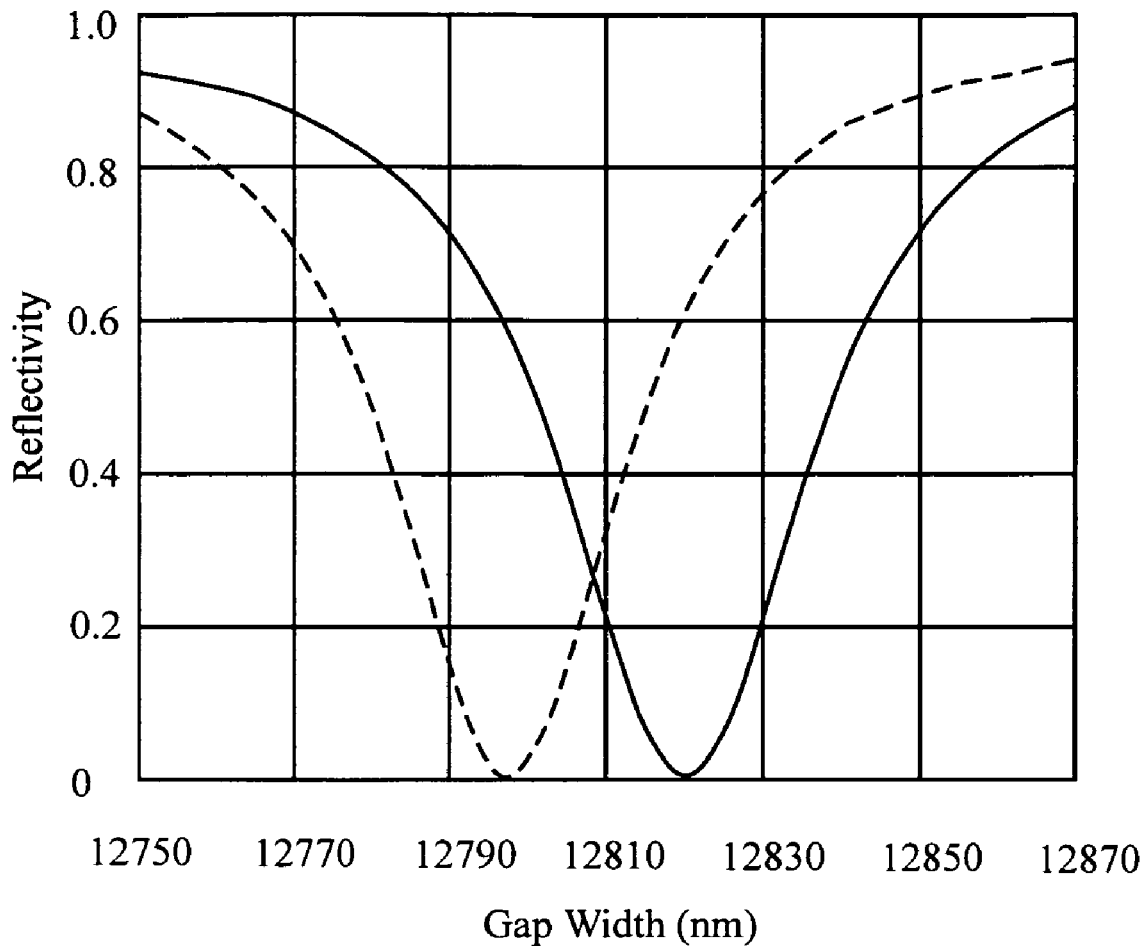
FIG. 3 graphically illustrates reflectivity as a function of gap width for the reflection mode Fabry-Perot interferometer of FIG. 1 for a first wavelength of 1550 nm and a second wavelength of 1480 nm.
Figure 4:
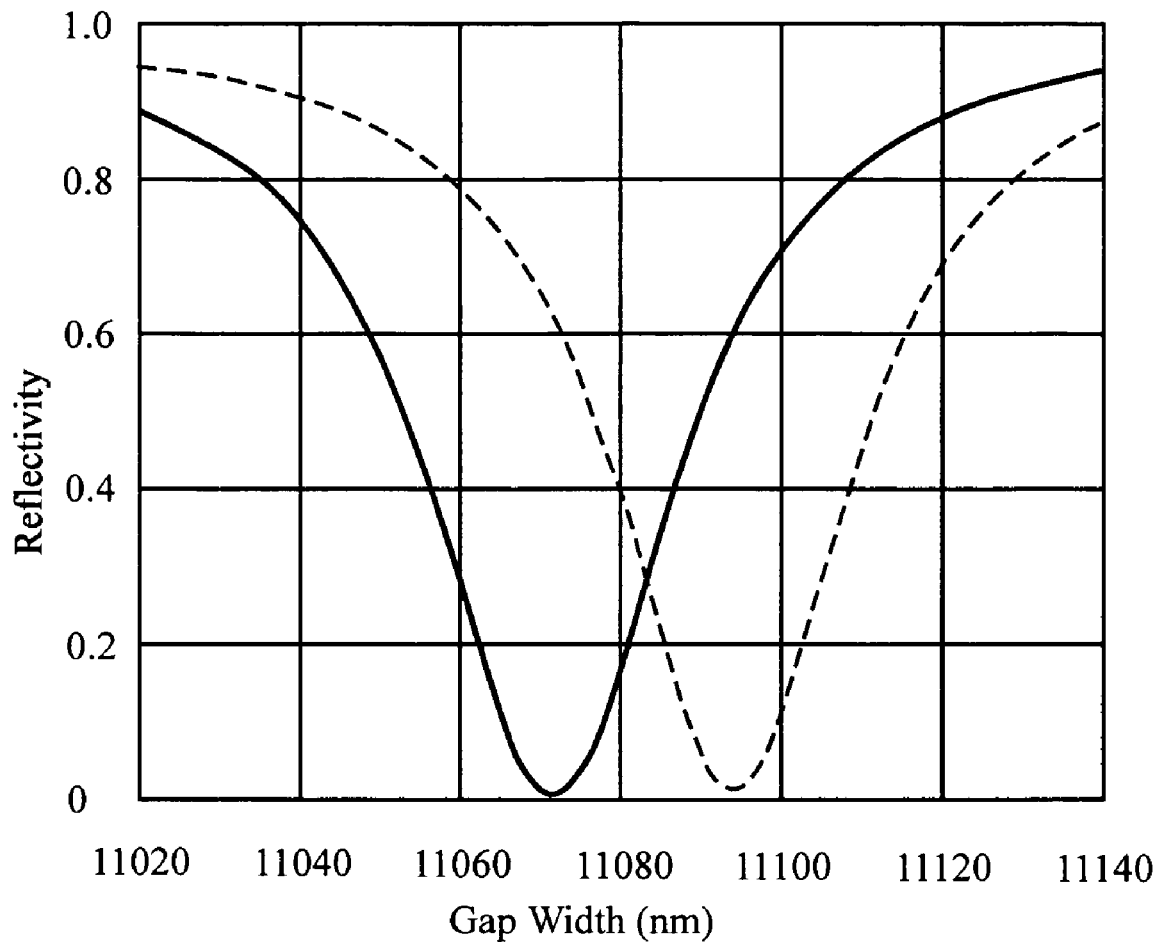
FIG. 4 graphically illustrates reflectivity as a function of gap width for the reflection mode Fabry-Perot interferometer of FIG. 1 for a first wavelength of 1550 nm and a second wavelength of 1475.5 nm.

FIGS. 3 and 4 show plots of reflected power back into the optical fiber 12 for two wavelengths $\lambda_A$ and $\lambda_B$ as functions of gap for both wavelengths. Both plots show two traces that cross one another at a reflected power of about 30%. Comparing FIGS. 3 and 4 shows that small changes in wavelength yield substantial changes in the desired gap width. Two wavelengths of about 1480 and 1550 nm have been selected. These are common wavelengths that are easily separated from one another by a small, inexpensive wavelength division multiplexer (WDM).

At a gap width associated with the crossing point, a small change in gap width increases reflected power for one wavelength and decreases by a like amount reflected power for the other wavelength. This push-pull behavior can be used to advantage in forming an acoustic sensor. The difference of the two reflected powers is twice as great as either one alone with a small change in gap width.

To implement this configuration in a fiber optic sensor array, more factors have to be taken into consideration. A method involving ratios of received powers at the two wavelengths can overcome these difficulties. A visibility function of the reflected powers at the two wavelengths is given by $$VIS(R_1, R_2, \text{gap}, \lambda_A, \lambda_B) = \frac{R_{fp}(R_1, R_2, \text{gap}, \lambda_B) - \alpha R_{fp}(R_1, R_2, \text{gap}, \lambda_A)}{R_{fp}(R_1, R_2, \text{gap}, \lambda_B) + \alpha R_{fp}(R_1, R_2, \text{gap}, \lambda_A)}. \quad (2)$$

where $\alpha$ is the ratio of optical powers input at the two wavelengths. When $\alpha$ is equal to one, equal amounts of optical power at the two wavelengths are delivered to the Fabry Perot sensor 20.

Figure 5:
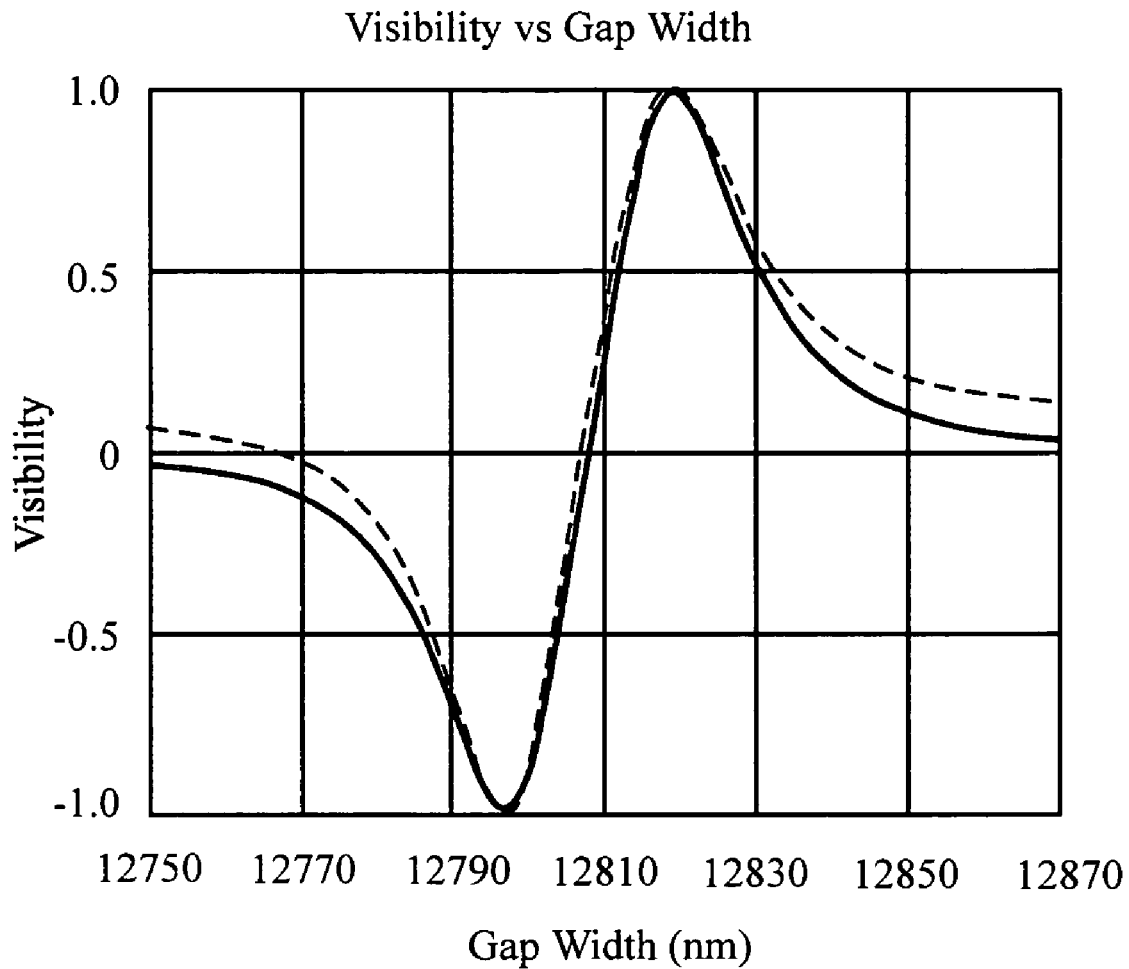
FIG. 5 graphically illustrates visibility as a function of gap width for the reflection mode Fabry-Perot interferometer of FIG. 1 for a first wavelength of 1550 nm and a second wavelength of 1480 nm.

FIG. 5 is a plot of visibility as a function of gap width. The visibility ranges between minus one and plus one with the steepest slope being at the sensor operating point where visibility is about zero. As shown by the plot, a substantial imbalance in the two powers at the two wavelengths has a minimal effect on the visibility. For example, a twenty percent imbalance of incident power at the two wavelengths has a very small effect on the visibility function.

Figure 6:
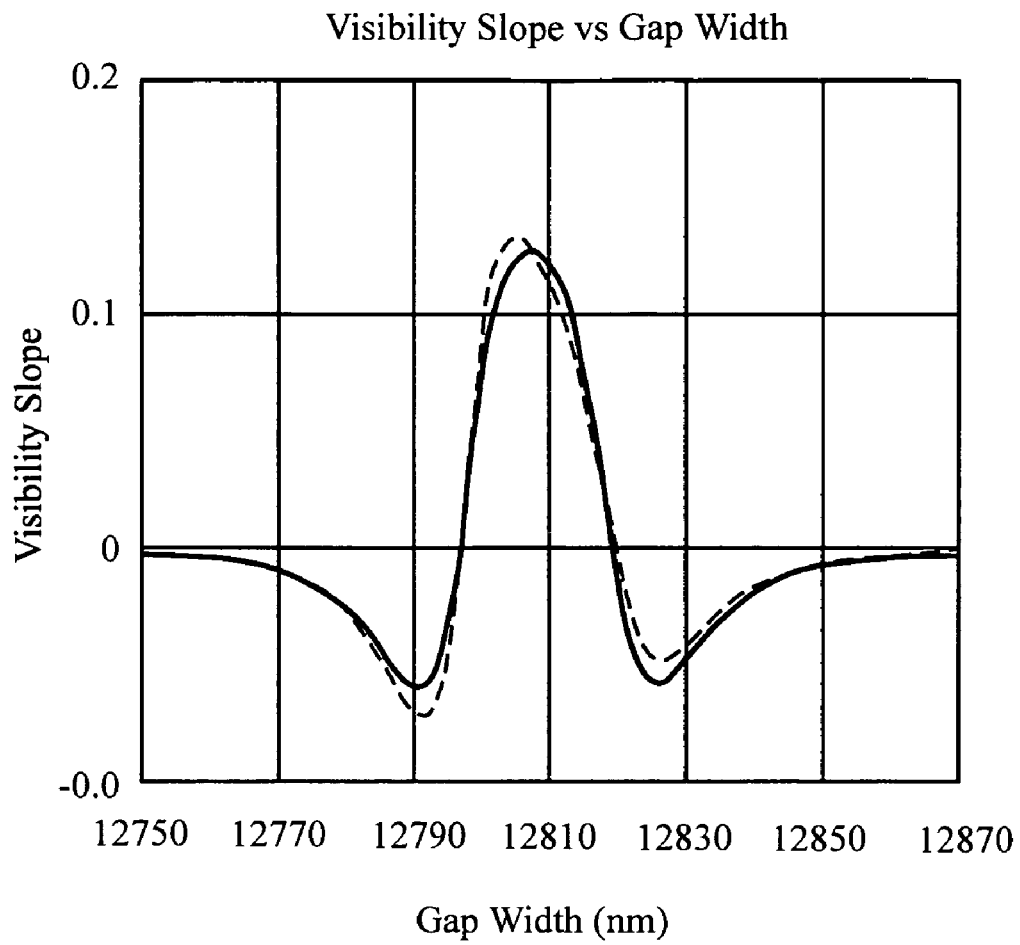
FIG. 6 graphically illustrates visibility slope as a function of gap width for the reflection mode Fabry-Perot interferometer of FIG. 1 for a first wavelength of 1550 nm and a second wavelength of 1480 nm.

FIG. 6 is a plot of the slope of the visibility function, or delta visibility, over delta gap width. For a range of motion of 5 nm, the slope is flat to about 3% for α=1.0. A flat slope implies a linear response. In other words, a change in acoustic pressure produces a proportional change in the visibility function. As the range of motion increases, there is more variability in the slope that produces increased harmonic distortion for very large acoustic tones. This is unlike the case of the phase generated carrier in which there is a catastrophic failure.

Figure 7:
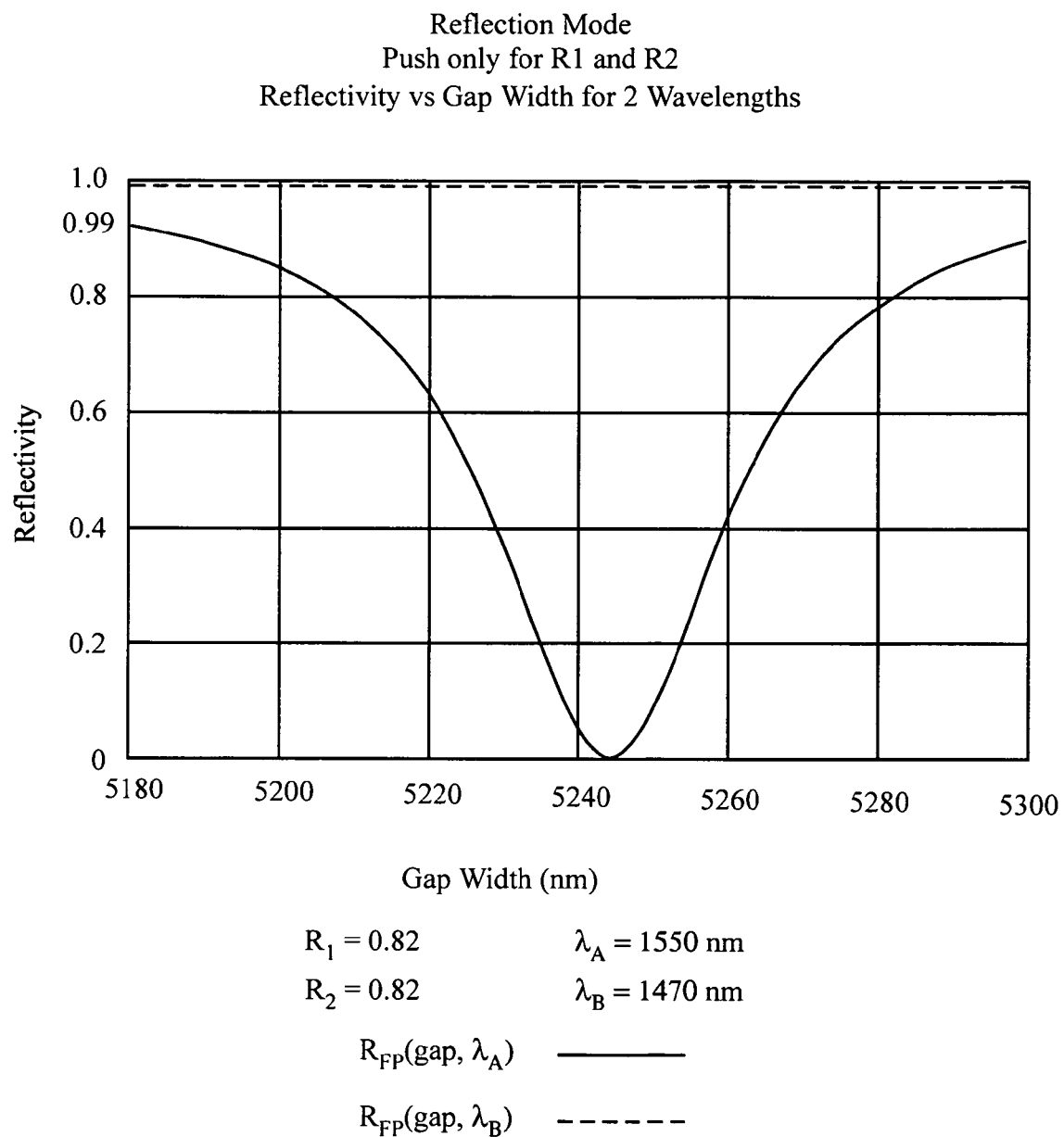
FIG. 7 graphically illustrates reflectivity as a function of gap width for a reflection mode Fabry-Perot interferometer for two wavelengths operated in a push only mode.
Figure 8:
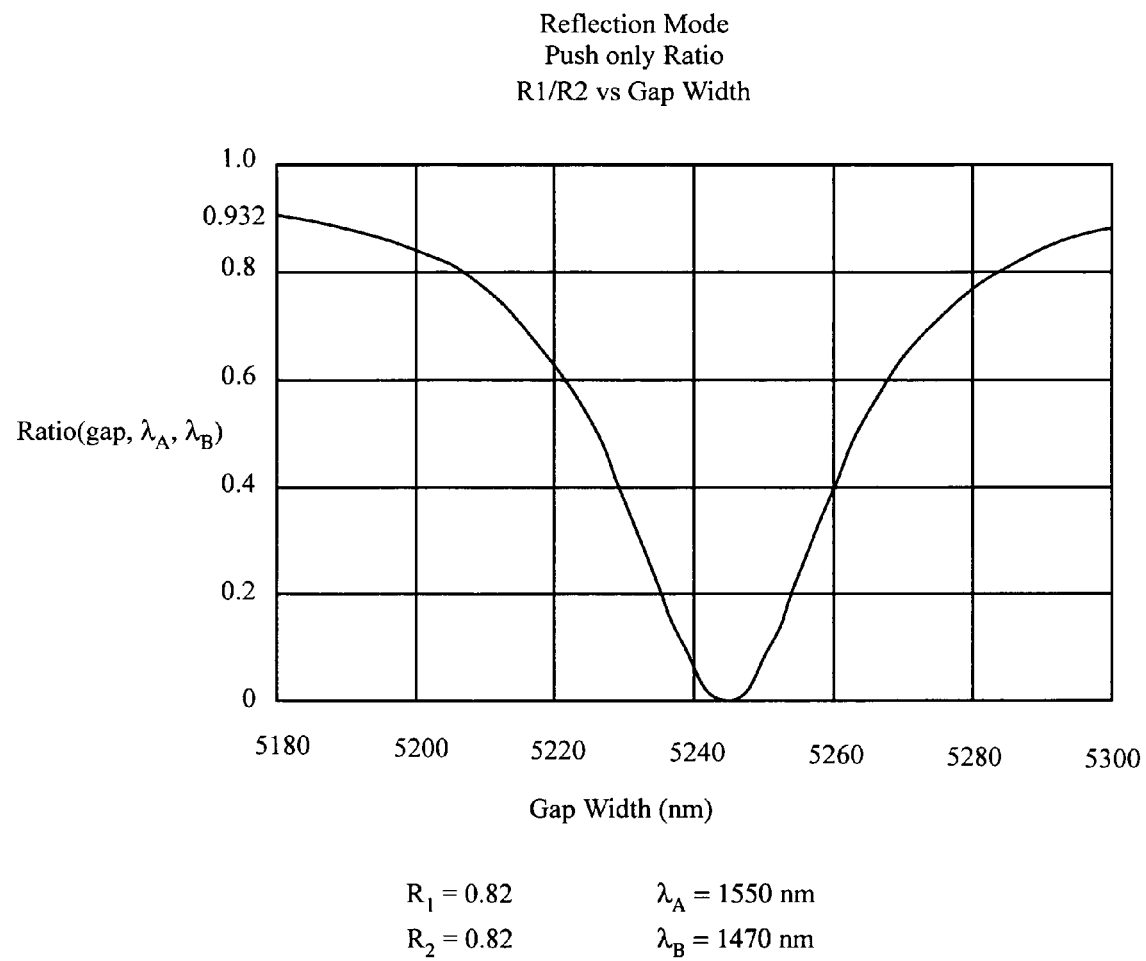
FIG. 8 graphically illustrates reflectivity ratios as a function of gap width for a reflection mode Fabry-Perot interferometer for two wavelengths operated in a push only mode.
Figure 9:
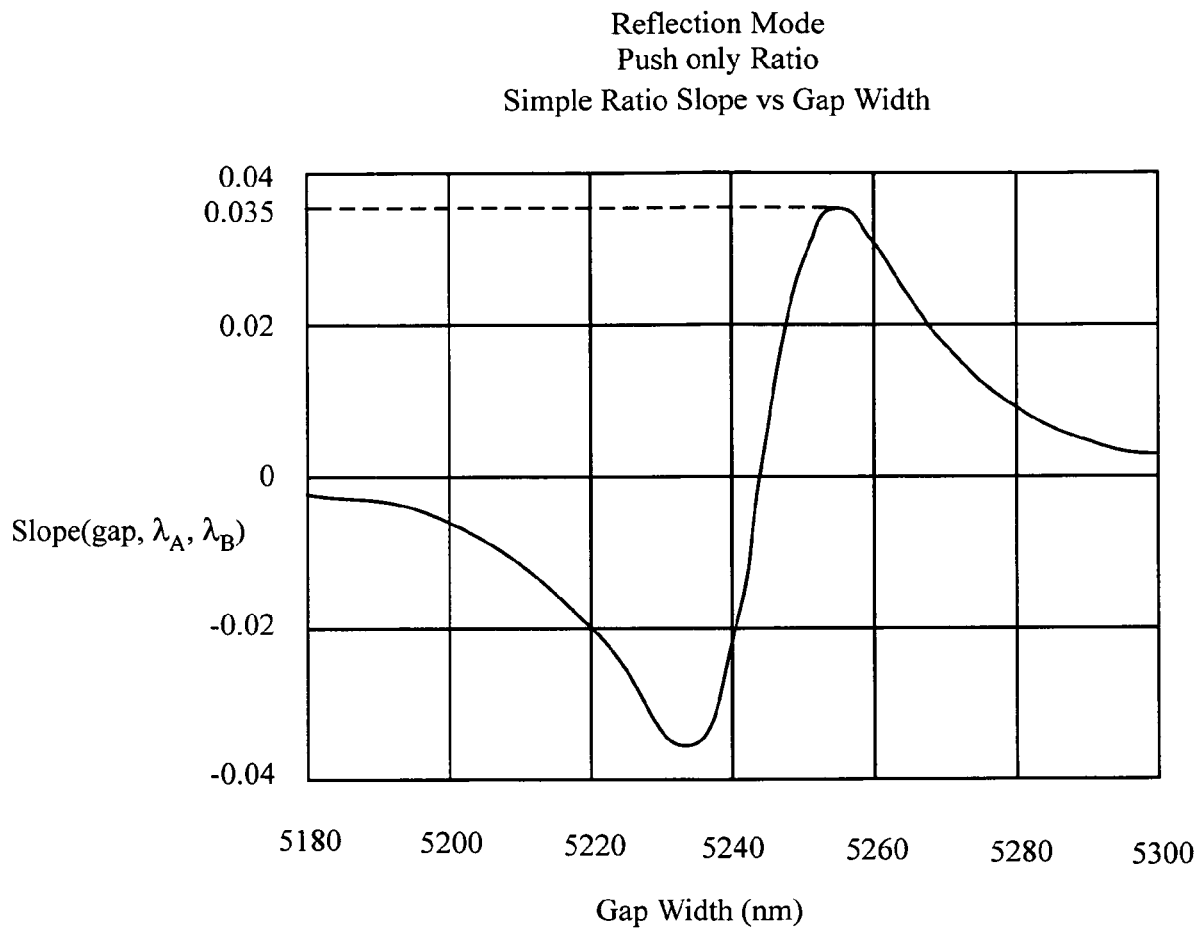
FIG. 9 graphically illustrates the slope of reflectivity ratios as a function of gap width for a reflection mode Fabry-Perot interferometer for two wavelengths operated in a push only mode.

FIG. 7 graphically illustrates reflectivity as a function of gap width for a reflection mode Fabry-Perot interferometer for two wavelengths operated in a push only mode. FIG. 8 graphically illustrates reflectivity ratios as a function of gap width for a reflection mode Fabry-Perot interferometer for two wavelengths operated in a push only mode. FIG. 9 graphically illustrates the slope of reflectivity ratios as a function of gap width for a reflection mode Fabry-Perot interferometer for two wavelengths operated in a push only mode.

Figure 10:
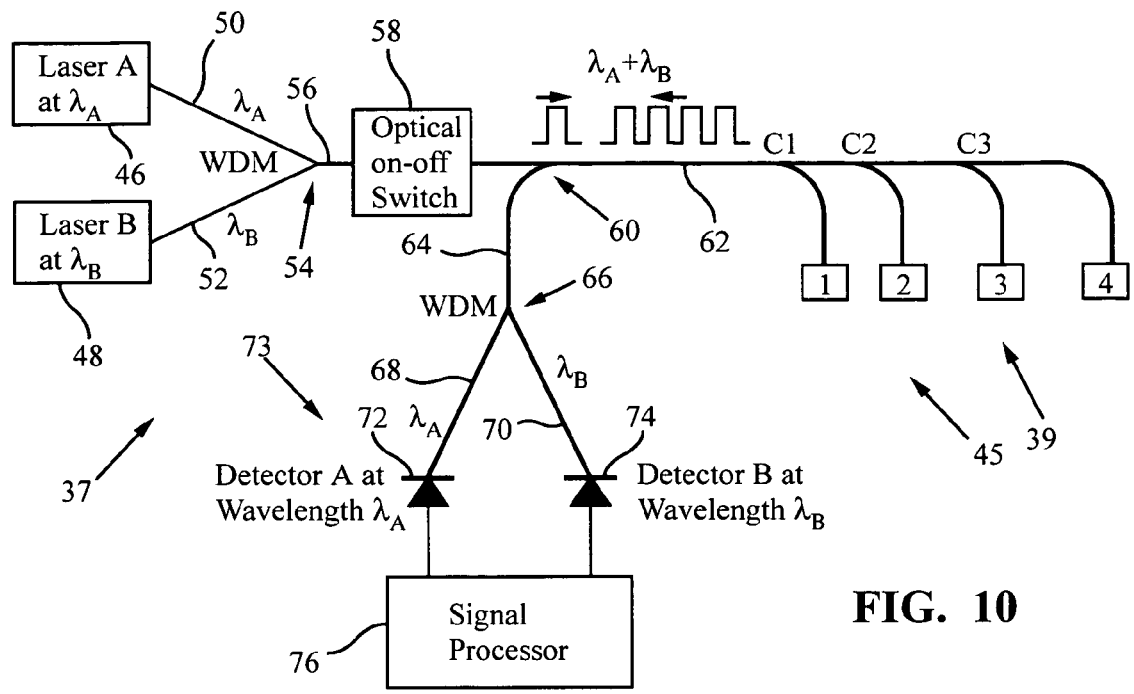
FIG. 10 schematically illustrates a time division multiplexed (TDM) two wavelength reflection mode Fabry Perot Sensor array according to the present invention.
Figure 11:
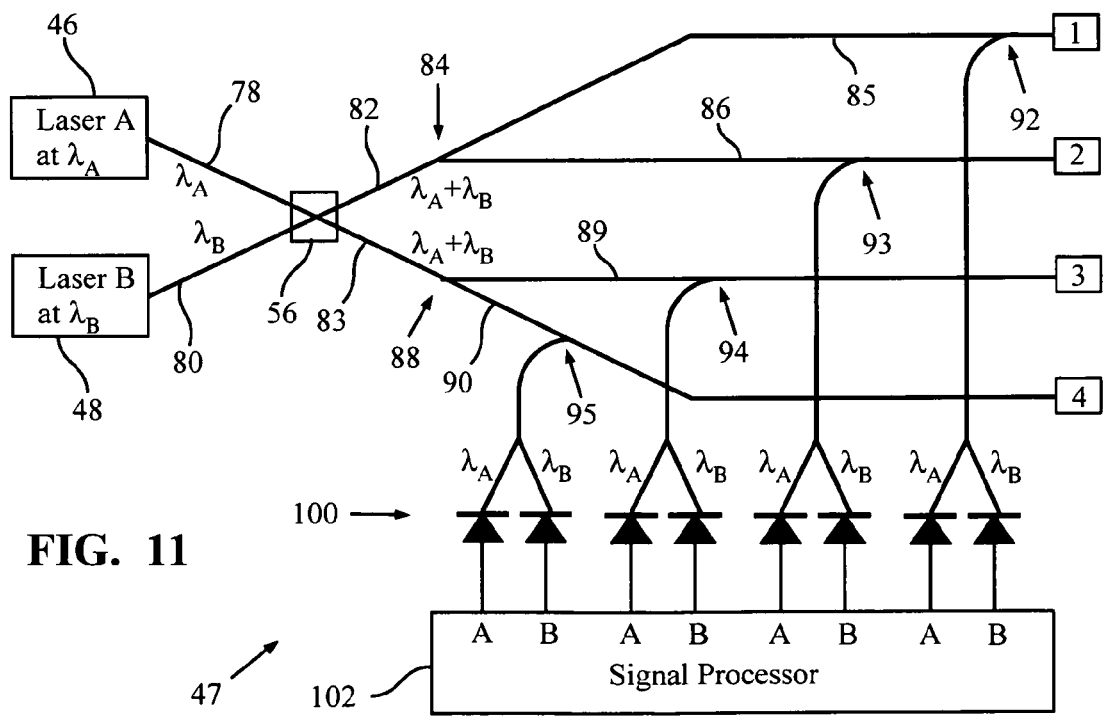
FIG. 11 schematically illustrates a continuous wave (CW) two-wavelength reflection mode fan-out Fabry Perot Sensor array according to the present invention.

FIGS. 10 and 11 show examples of two different array architectures for push-pull Fabry Perot sensors. FIG. 10 shows a time division multiplexed (TDM) architecture 45, and FIG. 11 shows a fan-out continuous wave (CW) architecture 47.

Referring to FIG. 10, a pair of lasers 46 and 48 provides optical signals at wavelengths $\lambda_A$ and $\lambda_B$, respectively, to corresponding optical fibers 50 and 52, respectively. The optical fibers 50 and 52 guide the signals output from the lasers 46 and 48 to a wavelength division multiplexer (WDM) 54. The WDM 54 inputs the signals from the lasers 46 and 48 into an optical fiber 56 that is arranged to guide the laser signals of wavelengths $\lambda_A$ and $\lambda_B$ into an optical on-off switch 58. Signals output from the switch 58 are input to a fiber optic coupler (or circulator) 60. The two wavelengths $\lambda_A$ and $\lambda_B$ propagate from the coupler 60 in an optical fiber 62 to couplers C1-C3 that couple the optical signals into two-wavelength Fabry Perot sensors 1-3 formed as described above with reference to FIG. 1. The optical fiber 62 terminates in a Fabry-Perot sensor 4. Signals output from the Fabry-Perot sensors 1-4 propagate back to the optical coupler 60 to be coupled into an optical fiber 64. The optical fiber 64 guides the sensor output signals to a WDM 66 that is arranged to input sensor output signals of wavelength $\lambda_A$ into an optical fiber 68 and sensor output signals of wavelength $\lambda_B$ into an optical fiber 70. The optical fiber 68 guides sensor output signals of wavelength $\lambda_A$ to a photodetector 72, which is also designated as photodetector A, and the optical fiber 70 guides sensor output signals of wavelength $\lambda_B$ to a photodetector 74, which is also designated as photodetector B. The photodetectors 72 and 74 produce electrical signals that indicate the intensities of the signals of wavelength $\lambda_A$ and $\lambda_B$, respectively, and are processed by a signal processor 76 to determine the pressure in the incident acoustic wave.

The gating of pulses is produced by the external on-off switch 58 as shown or by turning the lasers 46 and 48 on and off by current modulation. The optical switch 58 can be a semiconductor optical amplifier (SOA) gate or an electro-optic gate. Inexpensive distributive feedback (DFB) lasers such as those used in telecommunications should be adequate for many applications. The coupler ratios for each tap coupler are designed for maximum return signal to the detectors. For N sensors, the factor $$\frac{1}{N^2}$$

governs the amount of light from each sensor incident on the detector.

The fan-out architecture 47 of FIG. 11 has no optical gating, which allows for much lower bandwidth operation. This comes at the expense of requiring many more detectors. However, detector arrays are available that have a small footprint, especially for low bandwidth operation. For N sensors, the factor 1/N governs the amount of light from each sensor incident on the detector.

Referring to FIG. 11, the fan-out architecture 47 includes the lasers 46 and 48 as described above with reference to FIG. 10. Optical fibers 78 and 80 guide signals of the two wavelengths $\lambda_A$ and $\lambda_B$ respectively, to a 2×2 optical coupler 81 that divides the input signals equally between optical fibers 82 and 83. Signals in the optical fiber 82 propagate to a 1×2 optical coupler 84 that couples light from the optical fiber 82 into two optical fibers 85 and 86. Signals in the optical fiber 83 propagate to a 1×2 coupler 88 that couples light from the optical fiber 83 into two optical fibers 89 and 90.

The optical fibers 85, 86, 89 and 90 and provide signals of both wavelengths $\lambda_A$ and $\lambda_B$ to corresponding two-wavelength Fabry-Perot sensors 1-4. Signals output from the Fabry-Perot sensors 1-4 are coupled into WDMs 92-95, respectively, that are arranged to provide sensor output signals of wavelengths $\lambda_A$ and $\lambda_B$ to a photodetector array 100 that has separate photodetectors A and B for signals of wavelengths A and B output from each Fabry-Perot sensor 1-4. A signal processor 102 is connected to the photodetector array 100 to receive electrical signals therefrom.

Figure 12:
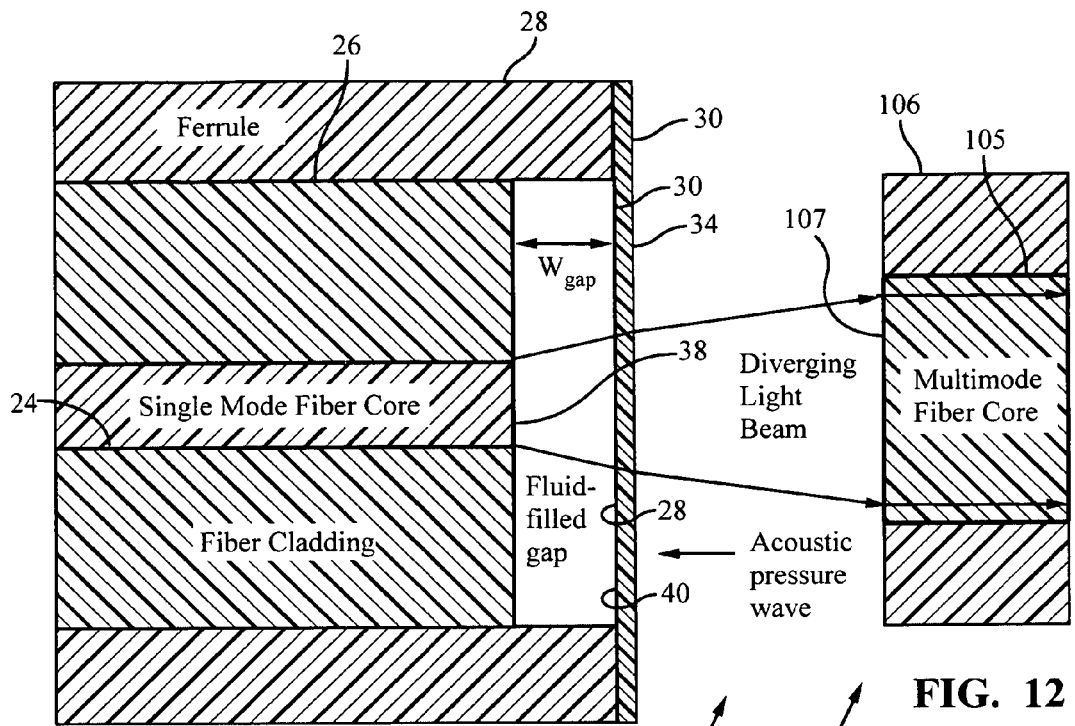
FIG. 12 illustrates a transmission mode Fabry Perot interferometer.

FIG. 12 illustrates a second embodiment of a Fabry-Perot interferometer 103 that operates in a transmission mode. The Fabry-Perot interferometer 103 includes the optical fiber 22, ferrule 28 and fluid filled gap 36 of FIG. 1. However, the Fabry-Perot interferometer 103 includes a diaphragm 35 that transmits a portion of the incident light as a diverging light beam to an end 107 of a multimode optical fiber 104. The multimode optical fiber has a multimode core 105 and a cladding 106 as shown in FIG. 12. The where the interference signals are injected into the multimode core 105 for transmission to the photodetector array 100. The transmission mode Fabry-Perot interferometer 103 has a visibility ratio that may be expressed as $$VIS = \frac{T_1 - T_2}{T_1 + T_2} \quad (3)$$

where $T_1$ and $T_2$ are the transmissivities of the Fabry-Perot interferometer 103 at the wavelengths $\lambda_1$ and $\lambda_2$, respectively.

Figure 14:
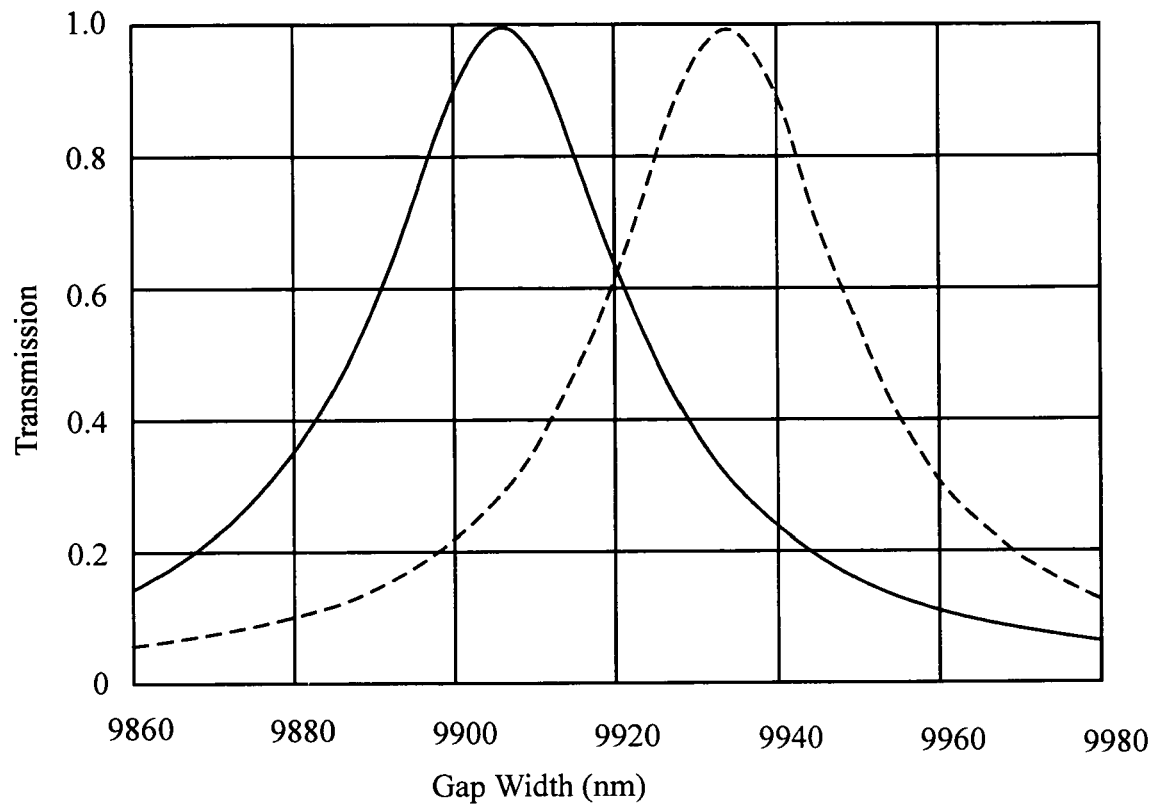
FIG. 14 graphically illustrates signal transmission as a function of gap width for the transmission mode Fabry-Perot interferometer of FIG. 9 operated in a push-pull mode.
Figure 15:
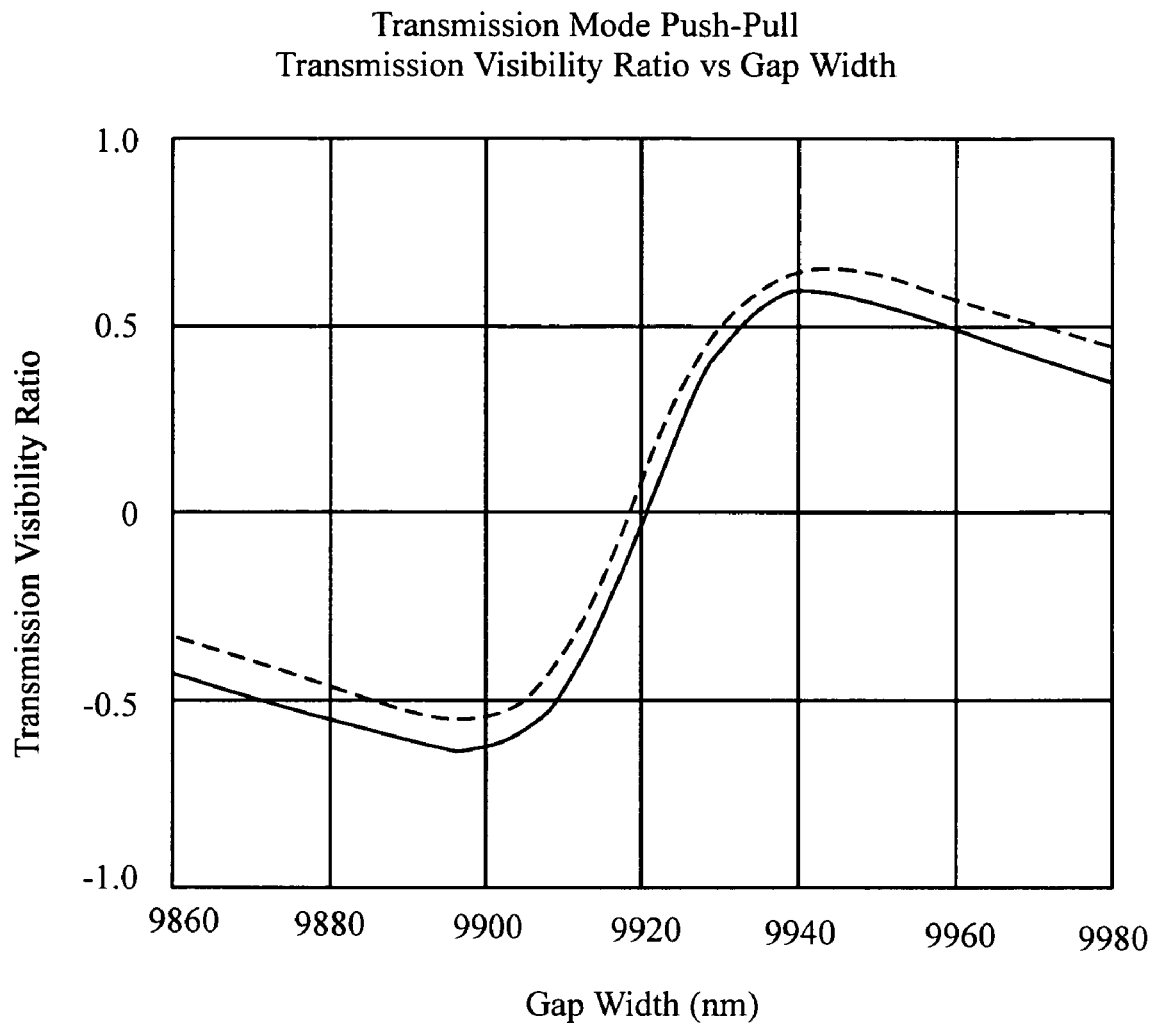
FIG. 15 graphically illustrates transmission visibility ratio as a function of gap width for the transmission mode Fabry-Perot interferometer of FIG. 9 operated in a push-pull mode.
Figure 16:
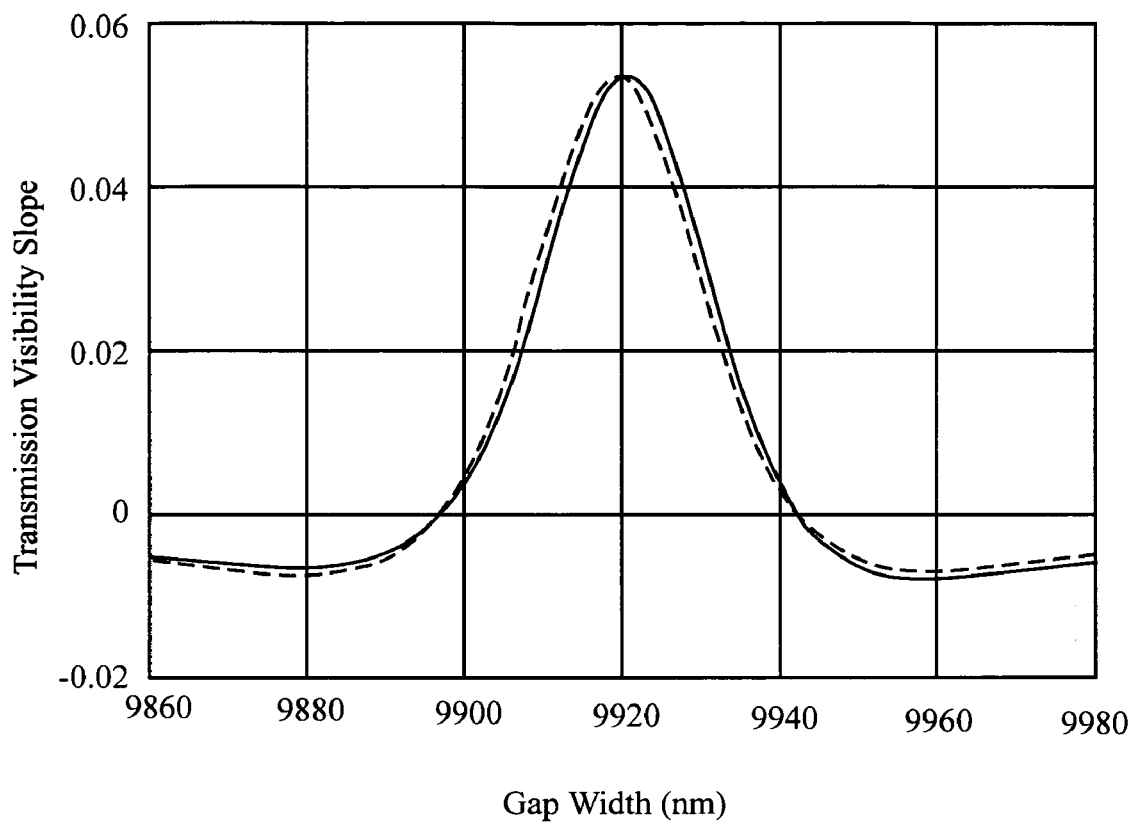
FIG. 16 graphically illustrates transmission visibility slope as a function of gap width for the transmission mode Fabry-Perot interferometer of FIG. 9 operated in a push-pull mode.

FIG. 14 graphically illustrates signal transmission as a function of gap width for the transmission mode Fabry-Perot interferometer of FIG. 9 operated in a push-pull mode. FIG. 15 graphically illustrates transmission visibility ratio as a function of gap width for the transmission mode Fabry-Perot interferometer of FIG. 9 operated in a push-pull mode. FIG. 16 graphically illustrates transmission visibility slope as a function of gap width for the transmission mode Fabry-Perot interferometer of FIG. 9 operated in a push-pull mode.

Figure 13:
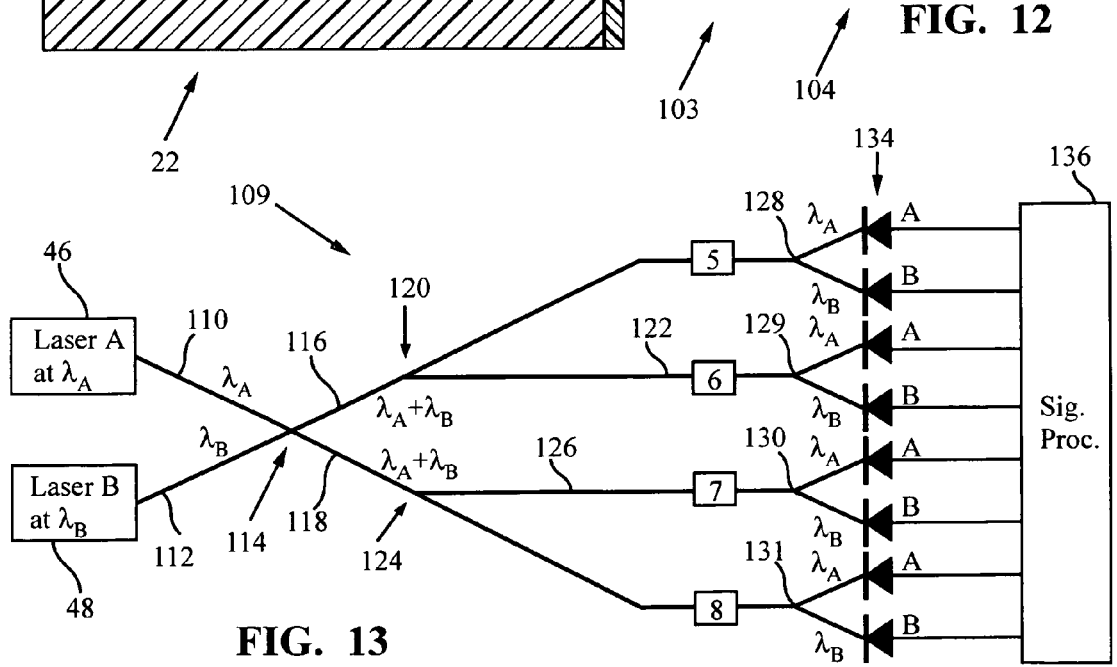
FIG. 13 schematically illustrates a continuous wave (CW) two wavelength transmission mode Fabry Perot Sensor array according to the present invention that includes a plurality of transmission mode Fabry Perot interferometers according to FIG. 12.

FIG. 13 shows a transmission mode sensor array 109 that includes a plurality of Fabry-Perot interferometers 5-8 formed in accordance with FIG. 12. The array 109 includes the lasers 46 and 48 that provide laser light at wavelengths $\lambda_A$ and $\lambda_B$, respectively. The optical signal output from the lasers 46 and 48 are input to optical fibers 110 and 112, respectively, that are each connected to a 2×2 optical coupler 114. The WMD 114 couples signals of both wavelengths $\lambda_A$ and $\lambda_B$ into optical fibers 116 and 118. The fiber 116 guides the optical signal therein to a 1×2 optical coupler 120 that divides the optical signal between the optical fiber 116 and an optical fiber 122 that provide light to the Fabry-Perot interferometers 5 and 6, respectively. The optical fiber 118 guides the optical signal therein to a 1×2 optical coupler 124 that divides the optical signal between the optical fiber 118 and an optical fiber 126 that provide light to the Fabry-Perot interferometers 7 and 8, respectively.

The Fabry-Perot interferometers 5-8 provide interference signals to corresponding WDMs 128-131, respectively. The WDMs divide the signal from each of the Fabry-Perot interferometers 5-8 into separate signals according to wavelength to provide separate signals of wavelength $\lambda_A$ and $\lambda_B$ for each of the Fabry-Perot interferometers 5-8. The signals output from the WDMs are incident upon photodetectors A and B for each wavelength $\lambda_A$ and $\lambda_B$.

The array 103 of transmission mode Fabry-Perot interferometers 5-8 requires fewer couplers than are required for the reflection mode Fabry-Perot interferometer architecture arrays 45 and 47 and therefore provides an increase in detected power.

What is claimed is:

1. A fiber optic sensor array, comprising:
    a first coherent optical signal source that produces an optical signal of wavelength $\lambda_A$;
    a first optical fiber in optical communication with the first coherent optical signal source to guide the optical signal of wavelength $\lambda_A$;
    a second coherent optical signal source that produces an optical signal of wavelength $\lambda_B$;
    a second optical fiber in optical communication with the second coherent optical signal source to guide the optical signal of wavelength $\lambda_B$;
    an input wavelength division multiplexer connected to the first and second optical fibers to receive the optical signals of $\lambda_A$ and $\lambda_B$ therefrom as optical signal inputs;
    a signal transmission optical fiber connected to the input wavelength division multiplexer to guide optical signals of both wavelengths $\lambda_A$ and $\lambda_B$ therefrom;
    an array of two-wavelength Fabry-Perot interferometric sensors coupled to the signal transmission optical fiber to receive optical signals of wavelengths $\lambda_A$ and $\lambda_B$ therefrom, the array of two-wavelength Fabry-Perot interferometric sensors being arranged to produce interferometer output signals in response to an acoustic pressure wave incident upon the array of two-wavelength Fabry-Perot interferometric sensors, the Fabry-Perot interferometric sensors being formed to have signal outputs that operate in a push-pull mode in response to pressure variations in the acoustic pressure wave;
    an optical on-off switch connected between the input wavelength division multiplexer and the array of Fabry-Perot interferometric sensors to control transmission of optical signals through the signal transmission optical fiber;
    a time division multiplexed architecture connected to the optical switch wherein a plurality of optical couplers couple a corresponding plurality of two wavelength Fabry-Perot interferometric sensors to the signal transmission fiber and
    an output wavelength division multiplexer arranged to divide optical signals output from the plurality of Fabry-Perot interferometric sensors into a first output signal having wavelength $\lambda_A$ and a second output signal having wavelength $\lambda_B$;
    a detector array coupled to the output wavelength division multiplexer to produce electrical signals in response to the interferometer output signals;
    a signal processor connected to the detector array for processing the electrical signals from the detector array to indicate pressure from the acoustic pressure wave.

2. The fiber optic sensor array of claim 1 wherein the array of two-wavelength Fabry-Perot interferometric sensors comprises:
    a fan-out architecture of a plurality of two wavelength Fabry-Perot interferometric sensors coupled to the input wavelength division multiplexer to receive optical signals of wavelength $\lambda_A$ and $\lambda_B$ therefrom; and
    a photodetector array coupled to the fan-out architecture such that each two-wavelength Fabry-Perot interferometric sensor therein has an output coupled to a first corresponding photodetector arranged to detect signals of wavelength $\lambda_A$ and to a corresponding second photodetector arranged to detect signals of wavelength $\lambda_B$.

3. The fiber optic sensor array of claim 2 comprising a Fabry-Perot interferometric sensor formed to include a single mode optical filer, a ferrule mounted at an end of the single mode optical fiber so as to extend a distance $W_{gap}$ beyond the end, a diaphragm mounted on the ferrule to form an enclose region, the diaphragm being arranged to receive an acoustic pressure wave, the diaphragm being movable with respect to the end of the single mode optical fiber to modulate the distance between the diaphragm and end of the single mode optical fiber in response to pressure variations in the acoustic pressure wave, a fluid within the enclosed region; and a multimode optical fiber having an end of a multimode core arranged such that optical signals of wavelength $\lambda_A$ and $\lambda_B$ propagating in the single mode optical fiber undergo multiple reflections and produce a diverging light beam comprising interference signals of wavelengths $\lambda_A$ and $\pi_B$ that propagates through the diaphragm and are injected into the end of the multimode core.

4. A fiber optic sensor array, comprising:
    a first coherent optical signal source that produces an optical signal of wavelength $\lambda_A$;
    a first optical fiber in optical communication with the first coherent optical signal source to guide receive the optical signal of wavelength
    a second coherent optical signal source that produces an optical signal of wavelength $\lambda_B$;
    a second optical fiber in optical communication with the second coherent optical signal source to guide the optical signal of wavelength $\lambda_B$;
    an input wavelength division multiplexer connected to the first and second optical fibers to receive the optical signals of $\lambda_A$ and $\lambda_B$ therefrom as optical signal inputs;
    a signal transmission optical fiber connected to the input wavelength division multiplexer to guide optical signals of both wavelengths $\lambda_A$ and $\lambda_B$ therefrom;
    an array of two-wavelength Fabry-Perot interferometric sensors tousled to the signal transmission optical fiber to receive optical signals of wavelengths $\lambda_A$ and $\lambda_B$ therefrom, the array of two-wavelength Fabry-Perot interferometric sensor being arranged to produce interferometer output signals in response to an acoustic pressure wave incident upon the array of two-wavelength Fabry-Perot interferometric sensors, the Fabry-Perot interferometric sensors being formed to have signal outputs that operate in a push-pull mode in response to pressure variations in the acoustic pressure wave, wherein the array of two-wavelength Fabry-Perot interferometric sensors comprises a fan-out architecture of a plurality of two wavelength Fabry-Perot interferometric sensors coupled to the input wavelength division multiplexer to receive optical signals of wavelength $\lambda_A$ and $\lambda_B$ therefrom, and wherein each of the two-wavelength Fabry-Perot interferometric sensors includes a single mode optical fiber, a ferrule mounted at an end of the single mode optical fiber so as us extend a distance $W_{gap}$ beyond the end, a diaphragm mounted on the ferrule to form an enclosed region, the diaphragm being arranged to receive an acoustic pressure wave, the diaphragm being movable with respect to the end of the single mode optical fiber to modulate the distance between the diaphragm and end of the single mode optical fiber in response to pressure variations in the acoustic pressure wave, a fluid within the enclosed region; and a multimode optical fiber having an end of a multimode core arranged such that optical signals of wavelength $\lambda_A$ and $\lambda_B$ propagating in the single mode optical fiber undergo multiple reflections and produce a diverging light beam comprising interference signals of wavelengths $\lambda_A$ and $\lambda_B$ that propagate through the diaphragm and are injected into the end of the multimode core;

a photodetector array coupled to the fan-out architecture such that each two-wavelength Fabry-Perot interferometric sensor therein has an output couple to a first corresponding photodetector arranged to detect signals of wavelength $\lambda_A$ an to a corresponding second photodetector arranged to detect signals of wavelength $\lambda_B$: and a signal processor connected to the photodetector array for processing the electrical signals from the detector array to indicate pressure from the acoustic pressure wave.

* * * * *